(12) United States Patent
Bauer et al.

(10) Patent No.: US 6,735,193 B1
(45) Date of Patent: May 11, 2004

(54) METHOD AND APPARATUS FOR SUPPRESSION OF PACKETS DURING SILENCE PERIODS IN A PACKET TELEPHONY SYSTEM

(75) Inventors: Eric Jonathan Bauer, Freehold, NJ (US); Fang-Fe S. Huan, Marlboro, NJ (US); Yuk-Ming Peter Lam, Colts Neck, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/429,389

(22) Filed: Oct. 28, 1999

(51) Int. Cl.[7] ............................................. H04L 12/66
(52) U.S. Cl. ..................... 370/352; 370/236; 370/410; 370/428
(58) Field of Search ..................... 379/67.1, 72, 76, 379/88.13, 88.17, 265; 370/352, 410, 522, 428, 236

(56) References Cited

U.S. PATENT DOCUMENTS

| | | | | |
|---|---|---|---|---|
| 4,975,828 A | * | 12/1990 | Wishneusky | 364/200 |
| 5,457,687 A | * | 10/1995 | Newman | 370/232 |
| 5,706,279 A | * | 1/1998 | Teraslinna | 370/232 |
| 5,793,843 A | * | 8/1998 | Morris | 379/59 |
| 5,953,338 A | * | 9/1999 | Ma | 370/395 |
| 6,229,789 B1 | * | 5/2001 | Simpson | 370/235 |
| 6,366,651 B1 | * | 4/2002 | Griffith | 379/88.14 |
| 6,405,033 B1 | * | 6/2002 | Kennedy | 455/414 |
| 6,426,944 B1 | * | 7/2002 | Moore | 370/326 |
| 6,445,682 B1 | * | 9/2002 | Weitz | 370/257 |

OTHER PUBLICATIONS

Ulyess Black. Computer Networks Protocols, Standards, and Interfaces, dated 1987, pp. 2–4 and 52–54.*

* cited by examiner

*Primary Examiner*—Douglas Olms
*Assistant Examiner*—Robert W. Wilson
(74) *Attorney, Agent, or Firm*—Ryan, Mason & Lewis, LLP

(57) ABSTRACT

A method and apparatus are disclosed for notifying a far-end calling party when a near-end calling party utilizes a hold or mute feature. The present invention reduces bandwidth utilization by suppressing the transmission of packets during periods of extended silence. Each packet telephony device includes a packet suppression system that monitors local terminal activity and notifies the far-end party that the near-end device is discarding the "listen" stream. In addition, the disclosed packet suppression system monitors the incoming packets and processes such notifications from the far-end party that the far-end device is discarding the "listen" stream. In response, the packet suppression system can suppress the transmission of further packets and optionally activate a music-on-hold feature for the held party.

42 Claims, 3 Drawing Sheets

METHOD AND APPARATUS FOR SUPPRESSION OF PACKETS DURING SILENCE PERIODS IN A PACKET TELEPHONY SYSTEM

FIELD OF THE INVENTION

The present invention relates generally to packet telephony systems, and more particularly, to methods and apparatus for minimizing the bandwidth utilization in such packet telephony systems.

BACKGROUND OF THE INVENTION

Communication networks are used to transfer information, such as data, voice, text or video information, among communication devices, such as packet telephones, computer terminals, multimedia workstations, and videophones, connected to the networks. A network typically comprises nodes connected to each other, and to communication devices, by various links. Each link is characterized by a bandwidth or link capacity.

Within a corporate environment, telephone service has typically been provided by a private branch exchange (PBX) switch. Generally, a private branch exchange switch is an on-site facility, that is typically owned or leased by a company or another entity. The private branch exchange interconnects the telephones within the facility and provides access to the Public Switched Telephone Network (PSTN). The centralized PBX controls all aspects of a telephone connection. For example, if a given calling party is placed on hold, the PBX may respond by transmitting a music source to the calling party for a music-on-hold feature. In any event, the bandwidth that is allocated to a given call (typically 64-Kbps in each direction) is maintained for the entire length of the call, even during periods of extended silence, such as when a call is placed on hold, or when one caller utilizes a mute feature.

Information sent from a communication device to a network may be of any form, but is often formatted into fixed-length packets or cells. Packet-switching network architectures are widely used, for example, in popular local-area network (LAN) protocols, such as Ethernet and asynchronous transfer mode (ATM) protocols. In a packet-switched network, data transmissions are typically divided into blocks of data, called packets, for transmission through the network. For a packet to get to its proper destination, the packet must traverse through one or more network switches, routers or intermediate systems. Typically, a packet includes a header, containing source and destination address information, as well as a payload (the actual application data). Increasingly, such packet telephony systems are being utilized in corporate environments. Unlike a PBX environment, the packet data network used by the packet telephony system is typically shared with other network applications, such as web browsers, electronic mail, file and print servers. To avoid disrupting and degrading other applications that operate on the shared network, it is important to minimize network usage when possible.

A need therefore exists for a mechanism for suppressing the transmission of packets during periods of extended silence, for example, when a call is placed on hold, or when one calling party utilizes the traditional telephony "audio mute" feature. A further need exists for a method and apparatus that generates music for a music-on-hold feature locally at the terminal of the party that is placed on hold. Yet another need exists for a method and apparatus that automatically suppresses the transmission of packets that will not be processed by the receiver, such as an automated interactive voice response unit (IVR) or a voice mail system before recording commences. Another need exists for a method and apparatus that notifies a calling party when another calling party utilizes a hold or mute feature.

SUMMARY OF THE INVENTION

Generally, a method and apparatus are disclosed for notifying a far-end calling endpoint when a near-end calling party utilizes a hold or mute feature. The present invention reduces bandwidth utilization by suppressing the transmission of packets during periods of extended silence. Periods of silence are experienced, for example, when a call is placed on hold, or when packets will otherwise not be processed by the receiver, such as an automated interactive voice response unit or a voice mail system before recording commences. If a near-end party activates the "hold" feature, then the near-end party is both ignoring anything sent by the far-end device and is not sending any meaningful media to the far-end device.

According to one aspect of the invention, each device in a packet telephony system includes a packet suppression system that monitors local user or application activity (such as activating the "hold" feature) and notifies the far-end party that the near-end device is discarding the "listen" stream. In addition, the packet suppression system of the present invention monitors the incoming packets and processes such notifications from the far-end party that the far-end device is discarding the "listen" stream. In response, the packet suppression system can suppress the transmission of further packets and optionally activate a music-on-hold feature for the held party. In this manner, the bandwidth consumption and resource utilization at both the near and far-end devices are minimized by suppressing the transmission of further packets until the far-end device indicates that it is again utilizing the "listen" stream. The near-end device can implement a music-on-hold feature, for example, by switching the input stream for the speaker/handset from the silent "listen" stream to an appropriate audio source.

A more complete understanding of the present invention, as well as further features and advantages of the present invention, will be obtained by reference to the following detailed description and drawings.

DETAILED DESCRIPTION

Figure 1:
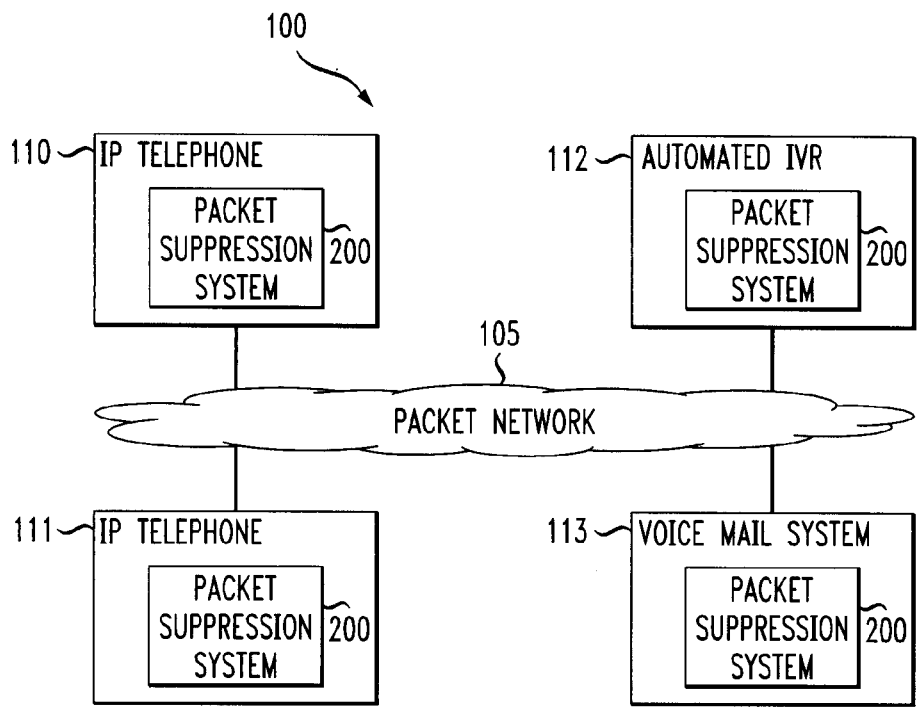
FIG. 1 illustrates a packet telephony system in which the present invention can operate.

FIG. 1 illustrates a packet telephony system 100. The packet telephony system 100 shown in FIG. 1 includes a packet network 105 that connects a number of devices, such as Internet protocol (IP) telephones 110, 111, an automated interactive voice response unit 112 and a voice mail system 113.

Each end-device 110–113 is a source of a media stream (a "talk" half-circuit) and a sink for a media stream (the "listen" half-circuit). Normally, the end-device is both playing the "listen" stream and sending a "talk" stream to the far-end device, and the far-end device is doing the same thing for the other far-end user. There are, however, several circumstances that lead an end-device to discard a "listen" stream or send silence on a "talk" stream or both. A "listen" stream will be discarded, for example, by an automated attendant, such as an automated interactive voice response unit (IVR) 112 that merely responds to dual-tone multi-frequency (DTMF) commands or a voice mail system 113 during playback of the outgoing voice message before recording commences. Likewise, if a device activates a hold feature, the holding party will discard the "listen" stream and send silence on the "talk" stream.

According to one feature of the present invention, each device in the packet telephony system 100 includes a packet suppression system 200, discussed further below in conjunction with FIG. 2, that monitors local terminal activity and notifies the far-end party that the near-end device is discarding the "listen" stream. In this manner, bandwidth consumption and resource utilization are minimized at both the near and far-end devices by suppressing the transmission of further packets until the near-end device is notified that the far-end device is again utilizing the "listen" stream.

As previously indicated, if the near-end device activates the "hold" feature, then the near-end device is both ignoring anything sent by the far-end device and is not sending any meaningful media to the far-end device. By notifying the far-end device that the near-end device is both discarding the "listen" stream and sending silence on the "talk" stream, then the present invention allows the far-end device to implement music-on-hold or some other advanced user experience for the "held" user at the far-end device. The far-end device can implement music-on-hold, for example, by switching the input stream for the speaker/handset from the silent "listen" stream to an appropriate audio source.

Figure 2:
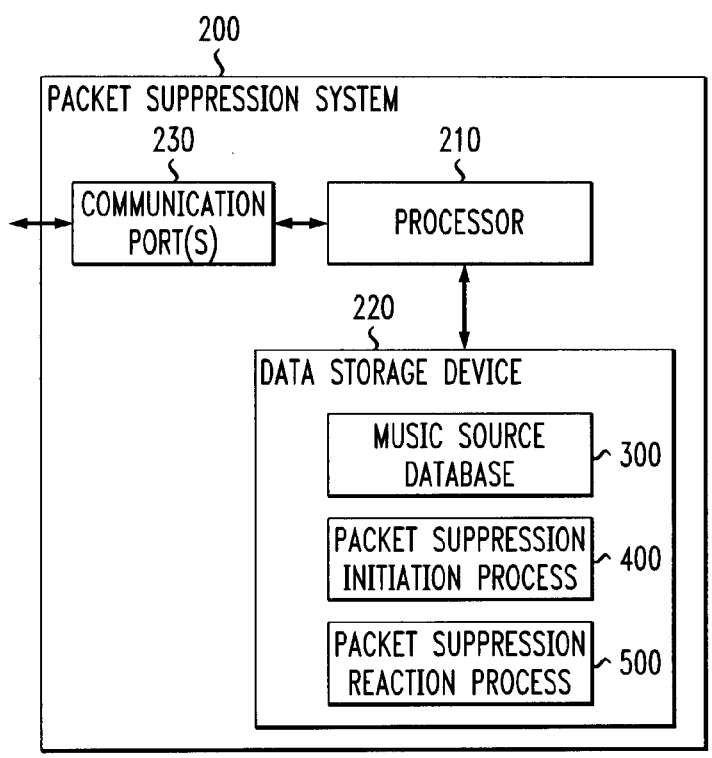
FIG. 2 is a schematic block diagram illustrating the packet suppression system of FIG. 1, in accordance with the present invention.

FIG. 2 is a block diagram showing the architecture of an illustrative packet suppression system 200. It is noted that the packet suppression system 200 shown in FIG. 2 has been generalized for use by all the devices 110–113 in FIG. 1 to illustrate the principles of the present invention. The packet suppression system 200 may be tailored for a specific device 110–113 and incorporate only a subset of the features discussed herein, as would be apparent to a person of ordinary skill in the art. The packet suppression system 200 includes a processor 210 and related memory, such as a data storage device 220. The processor 210 may be embodied as a single processor, or a number of processors operating in parallel. The data storage device 220 and/or a read only memory (ROM) are operable to store one or more instructions, which the processor 210 is operable to retrieve, interpret and execute.

Figure 3:
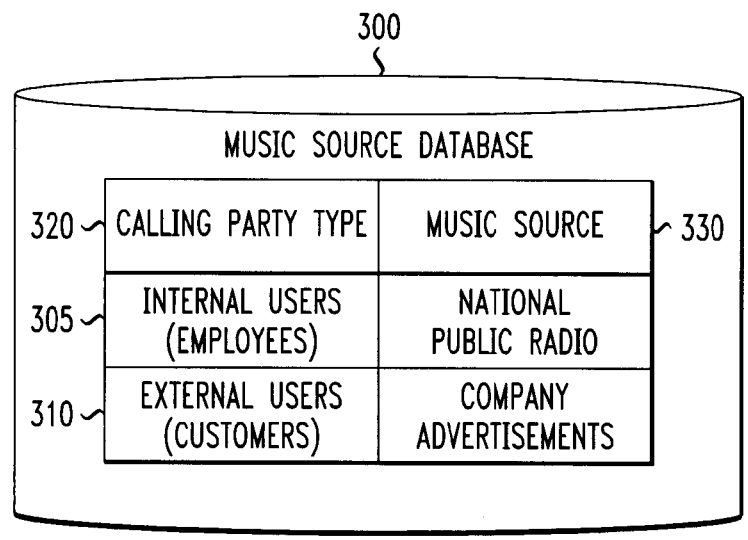
FIG. 3 illustrates a sample table from the music source database of FIG. 2.

As shown in FIG. 2, the data storage device 220 includes a music source database 300, shown in FIG. 3, that identifies an appropriate audio source for a music-on-hold feature for each class of telephone call, time-of-day, and/or other selection criteria. In addition, the data storage device 220 includes a packet suppression initiation process 400, shown in FIG. 4, that monitors local terminal activity and notifies the far-end party that the near-end device is discarding the "listen" stream. In addition, the data storage device 220 includes a packet suppression reaction process 500, shown in FIG. 5, that receives notifications from the far-end party that the far-end device is discarding the "listen" stream and activates music-on-hold or another appropriate feature.

The communications port 230 connects the packet suppression system 200 to the packet telephony environment 100, thereby linking the packet suppression system 200 to each connected node or party.

FIG. 3 illustrates an exemplary music source database 300 that identifies an appropriate audio source for a music-on-hold feature for each class of user, to implement a set of rules for a corporate user. The exemplary music source database 300 maintains a plurality of records, such as records 305 and 310, each associated with a different user type. For each user type listed in field 320, the music source database 300 identifies an appropriate audio source for a music-on-hold feature in field 330.

As previously indicated, the far-end device can implement music-on-hold, for example, by switching the input stream for the speaker/handset from the silent "listen" stream to an appropriate audio source identified in the music source database 300. For example, the audio source for the music-on-hold feature may be an Internet Radio (multicast) channel identified by a uniform resource locator (URL). The URL for the audio source could either be configured for the far-end device by the network management system, using, for example, some simple business rules. For example, as shown in FIG. 3, the business rules can specify that National Public Radio (NPR) should be utilized as the audio source for the music-on-hold feature of all internal users, while recorded company advertisements should be utilized as the audio source for the music-on-hold feature of all external users, such as potential customers.

In addition, since the present invention permits the music-on-hold feature to be controlled by the device of the held party, rather than the holding party, advanced music-on-hold schemes can be implemented. For example, each user can specify a set of music "presets," in a similar manner to an automobile radio, with each numeric key on the telephone device's keypad corresponding to a different preprogrammed music source. Thus, after being placed on hold, the packet suppression system 200 can automatically initiate the music-on-hold feature with the last music channel that was played until the held party presses a numeric key for a new desired music source. This mechanism can be extended to support background music so the system plays music from the speaker even when there is no active call.

Figure 4:
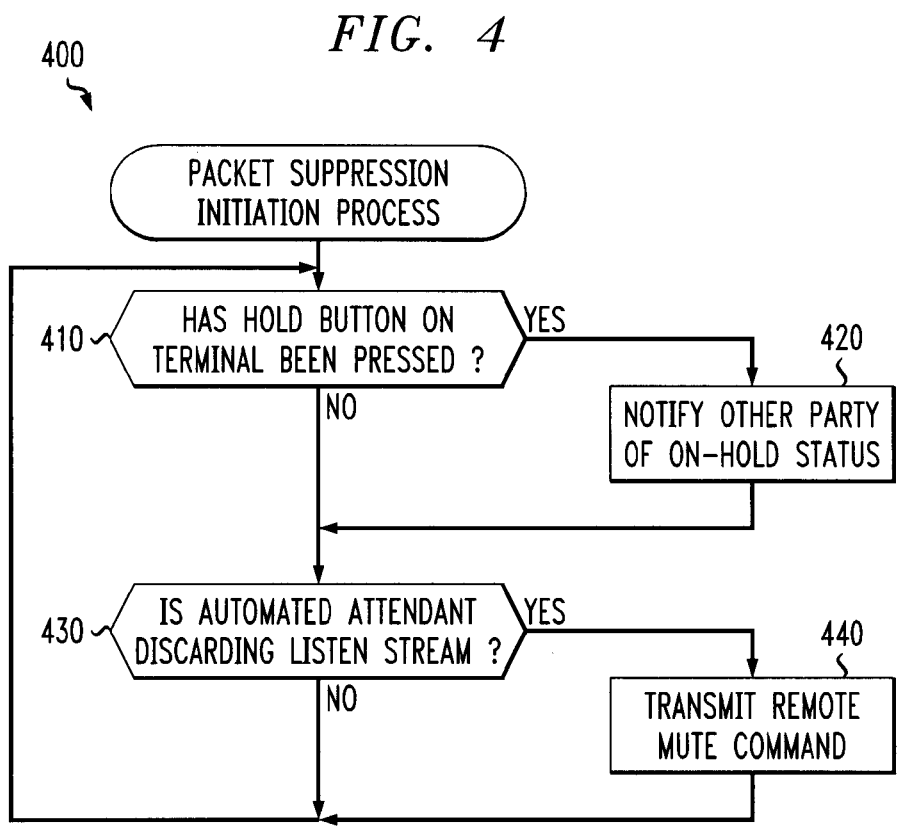
FIG. 4 is a flow chart describing an exemplary packet suppression initiation process implemented by the packet suppression system of FIG. 2.

FIG. 4 is a flow chart describing the packet suppression initiation process 400 that monitors the local terminal activity and notifies the far-end party when the near-end device is discarding the "listen" stream. The packet suppression initiation process 400 continuously monitors the local activity on the telephone, such as telephone 110, and performs a test during step 410 to determine if the hold button has been pressed by the user. If it is determined during step 410 that the hold button has been pressed by the user then the packet suppression system 200 will transmit a message to the other party to the call during step 420 indicating the on-hold status. It is noted that the reaction of the held party to the on-hold message is discussed below in conjunction with FIG. 5.

In the case of an automated attendant, such as an automated interactive voice response unit 112 or a voice mail system 113, the packet suppression initiation process 400 also continuously performs a test during step 430 to determine if the automated attendant is discarding the listen stream, for example, when an automated interactive voice response unit 112 merely responds to dual-tone multi-frequency commands or a voice mail system 113 during playback of the outgoing voice message before recording commences. If it is determined during step 430 that the automated attendant is discarding the listen stream, then the packet suppression system 200 will transmit a message to the other party to the call during step 420 initiating a remote mute. Thereafter, program control returns to step 410 to continue monitoring local activity.

Figure 5:
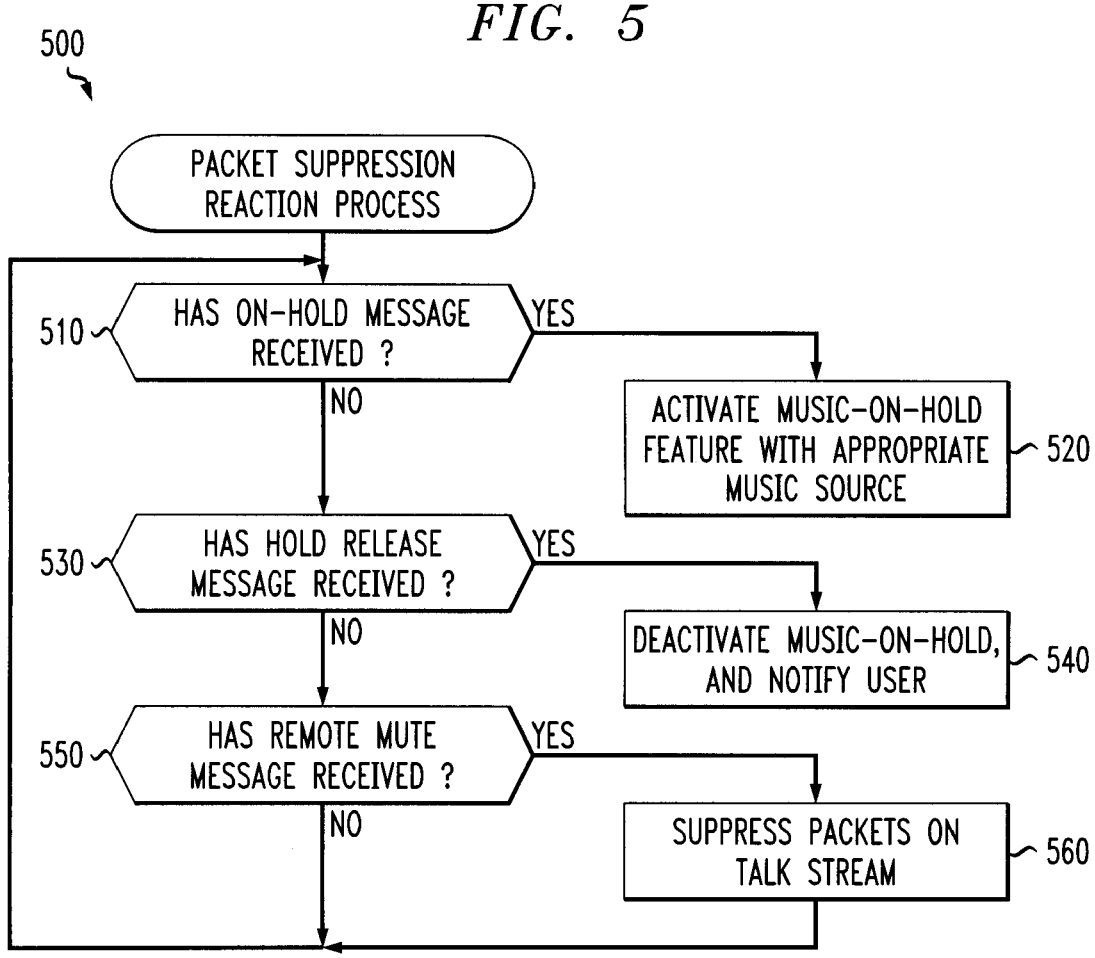
FIG. 5 is a flow chart describing an exemplary packet suppression reaction process implemented by the packet suppression system of FIG. 2.

FIG. 5 is a flow chart describing the packet suppression reaction process 500 that receives notifications from the far-end party that the far-end device is discarding the "listen" stream and activates music-on-hold or another appropriate feature. As shown in FIG. 5, the packet suppression reaction process 500 continuously monitors the incoming packets and performs a test during step 510 to determine if an on-hold message has been received from the other party. If it is determined during step 510 that an on-hold message has been received, then the packet suppression reaction process 500 will activate the music-on-hold feature during step 520 using an appropriate music source, for example, identified in the music source database 300.

In addition, the packet suppression reaction process 500 continuously monitors the incoming packets and performs a test during step 530 to determine if a hold release message has been received. If it is determined during step 530 that a hold release message has been received, then the packet suppression reaction process 500 will deactivate the music-on-hold feature during step 540 (if activated) and optionally notify the user, for example, by issuing a predefined tone. While a hold-activation message is required to be sent from the holding-party to the held-party, the hold-release message can be signaled implicitly by non-silence packets being sent from the holding-party.

In addition, the packet suppression reaction process 500 continuously monitors the incoming packets and performs a test during step 550 to determine if a remote mute message has been received. If it is determined during step 550 that a remote mute has been received, then the packet suppression reaction process 500 will suppress packets on talk stream during step 560.

To provide a superior user experience, it is important that the information that the talk or listen streams are being discarded or consumed be synchronized with the media itself. To assure the best possible synchronization, this information can be passed along in the Real-Time Protocol (RTP) media stream as control packets. It is noted that the Dual-Tone Multi-frequency (DTMF) signaling should be transmitted, even when one end has indicated that it is not listening to the media stream, as the DTMF signaling might be important to the application.

It is to be understood that the embodiments and variations shown and described herein are merely illustrative of the principles of this invention and that various modifications may be implemented by those skilled in the art without departing from the scope and spirit of the invention. For example, the music-on-hold feature can be controlled by the near-end device who puts the far-end device on hold. The hold-initiating party may want to specify which periodic messages to play during music-on-hold for the held party. This is accomplished by having the hold-initiating device server send a recommended music source to be played during hold to the held-party's device server. This recommended music source can contain, for example, advertisements, spoken information, or music. The URL for the recommended music source can be exchanged, for example, in the on-hold message packet that the hold-initiating device sends to the held-party, or it could be exchanged as part of the call-setup process.

We claim:

1. A method for reducing resource utilization between a near-end device and a far-end device in a packet telephony system, comprising the steps of:
   monitoring said near-end device to detect if said near-end device is discarding at least one communication stream between said near-end device and said far-end device; and
   notifying said far-end device that said near-end device is discarding at least one communication stream.

2. The method of claim 1, wherein said far-end device suppresses transmission of information until notified by the near-end device.

3. The method of claim 1, wherein said far-end device discards said communication stream when said near-end device puts a call on hold.

4. The method of claim 1, wherein said near-end device is an automated interactive voice response unit that responds to dual-tone multi-frequency commands.

5. The method of claim 1, wherein said near-end device is a voice mail system and said at least one communication stream is discarded during playback of the outgoing voice message before recording commences.

6. The method of claim 4, wherein said notification is a remote mute command.

7. The method of claim 1, further comprising the step of notifying said far-end device that said near-end device is again utilizing said communication stream.

8. A system for reducing resource utilization between a near-end device and a far-end device in a packet telephony system, comprising:
   a memory for storing computer-readable code; and
   a processor operatively coupled to said memory, said processor configured to:
      monitor said near-end device to detect if said near-end device is discarding at least one communication stream between said near-end device and said far-end device; and
      notify said far-end device that said near-end device is discarding at least one communication stream.

9. The system of claim 8, wherein said far-end device suppresses transmission of information until notified by the near-end device.

10. The system of claim 8, wherein said far-end device discards said communication stream when said near-end device puts a call on hold.

11. The system of claim 8, wherein said near-end device is an automated interactive voice response unit that responds to dual-tone multi-frequency commands.

12. The system of claim 8, wherein said near-end device is a voice mail system and said at least one communication stream is discarded during playback of the outgoing voice message before recording commences.

13. The system of claim 12, wherein said notification is a remote mute command.

14. The system of claim 8, further comprising the step of notifying said far-end device that said near-end device is again utilizing said communication stream.

15. A method for reducing resource utilization between a near-end device and a far-end device in a packet telephony system, comprising the steps of:
   monitoring incoming packets for a notification that said far-end device is discarding at least one communication stream; and
   suppressing the transmission of further packets on said communication stream.

16. The method of claim 15, further comprising the step of activating a music-on-hold feature for said near-end device.

17. The method of claim 16, wherein said music-on-hold feature utilizes a predefined music source for each user class.

18. The method of claim 16, wherein said music-on-hold feature utilizes a predefined music source for a certain time interval.

19. The method of claim 16, wherein said music-on-hold feature utilizes a predefined music source for a certain type of call.

20. The method of claim 15, further comprising the step of monitoring incoming packets for a notification that said far-end device is again utilizing said communication stream.

21. The method of claim 20, further comprising the step of reactivating said communication stream following a notification that said far-end device is again utilizing said communication stream.

22. The method of claim 15, wherein said near-end device discards said communication stream when said far-end device puts a call on hold.

23. The method of claim 15, wherein said far-end device is an automated interactive voice response unit that responds to dual-tone multi-frequency commands.

24. The method of claim 15, wherein said far-end device is a voice mail system and said at least one communication stream is discarded during playback of the outgoing voice message before recording commences.

25. The method of claim 15, wherein said notification is a remote mute command.

26. A method for reducing resource utilization between a near-end device and a far-end device in a packet telephony system, comprising the steps of:

monitoring incoming packets for a notification that said far-end device is discarding at least one communication stream; and activating a music-on-hold feature for said near-end device in response to said notification that said far-end device is discarding at least one communication stream.

27. The method of claim 26, wherein said music-on-hold feature utilizes a local music source.

28. The method of claim 26, wherein said music-on-hold feature utilizes a predefined music source for each user class.

29. The method of claim 26, wherein said music-on-hold feature utilizes a predefined music source for a certain time interval.

30. The method of claim 26, wherein said music-on-hold feature utilizes a predefined music source for a certain type of call.

31. A system for reducing resource utilization between a near-end device and a far-end device in a packet telephony system, comprising:

a memory for storing computer-readable code; and a processor operatively coupled to said memory, said processor configured to:

monitor incoming packets for a notification that said far-end device is discarding at least one communication stream; and suppress the transmission of further packets on said communication stream.

32. The system of claim 31, further comprising the step of monitoring incoming packets for a notification that said far-end device is again utilizing said communication stream.

33. The system of claim 32, further comprising the step of reactivating said communication stream following a notification that said far-end device is again utilizing said communication stream.

34. The system of claim 31, wherein said near-end device discards said communication stream when said far-end device puts a call on hold.

35. The system of claim 31, wherein said far-end device is an automated interactive voice response unit that responds to dual-tone multi-frequency commands.

36. The system of claim 31, wherein said far-end device is a voice mail system and said at least one communication stream is discarded during playback of the outgoing voice message before recording commences.

37. The system of claim 31, wherein said notification is a remote mute command.

38. A system for reducing resource utilization between a near-end device and a far-end device in a packet telephony system, comprising:

a memory for storing computer-readable code; and a processor operatively coupled to said memory, said processor configured to:

monitor incoming packets for a notification that said far-end device is discarding at least one communication stream; and activate a music-on-hold feature for said near-end device in response to said notification that said far-end device is discarding at least one communication stream.

39. The system of claim 38, wherein said music-on-hold feature utilizes a local music source.

40. The system of claim 38, wherein said music-on-hold feature utilizes a predefined music source for each user class.

41. The system of claim 38, wherein said music-on-hold feature utilizes a predefined music source for a certain time interval.

42. The system of claim 38, wherein said music-on-hold feature utilizes a predefined music source for a certain type of call.

\* \* \* \* \*